United States Patent
Min et al.

(10) Patent No.: US 8,060,839 B2
(45) Date of Patent: Nov. 15, 2011

(54) CHARACTER INPUT METHOD AND MOBILE COMMUNICATION TERMINAL USING THE SAME

(75) Inventors: Byung Jo Min, Seoul (KR); Jun Il Hong, Yongin-si (KR); Ick Bae Jun, Seoul (KR)

(73) Assignee: Samsung Electronics Co., Ltd (KR)

(*) Notice: Subject to any disclaimer, the term of this patent is extended or adjusted under 35 U.S.C. 154(b) by 1115 days.

(21) Appl. No.: 11/768,638

(22) Filed: Jun. 26, 2007

(65) Prior Publication Data
US 2008/0001788 A1 Jan. 3, 2008

(30) Foreign Application Priority Data
Jun. 30, 2006 (KR) .................. 10-2006-0060213

(51) Int. Cl.
G06F 3/048 (2006.01)
G06F 3/14 (2006.01)
G06F 3/02 (2006.01)

(52) U.S. Cl. .................. 715/816; 715/864; 345/169

(58) Field of Classification Search .................. 715/816, 715/864; 345/169
See application file for complete search history.

(56) References Cited

U.S. PATENT DOCUMENTS

| | | | |
|---|---|---|---|
| 5,128,672 A | | 7/1992 | Kaehler |
| 5,818,437 A | * | 10/1998 | Grover et al. .................. 715/811 |
| 5,953,541 A | * | 9/1999 | King et al. ....................... 710/67 |
| 6,204,848 B1 | * | 3/2001 | Nowlan et al. .................. 715/810 |
| 6,223,059 B1 | * | 4/2001 | Haestrup ........................ 455/566 |
| 6,346,894 B1 | * | 2/2002 | Connolly et al. ................ 341/22 |
| 6,430,405 B1 | * | 8/2002 | Jambhekar et al. ........... 455/403 |
| 6,442,270 B1 | * | 8/2002 | Simon et al. .............. 379/355.09 |
| 6,473,621 B1 | * | 10/2002 | Heie .............................. 455/466 |
| 6,559,778 B1 | | 5/2003 | Hillmering |
| 6,606,486 B1 | * | 8/2003 | Cubbage et al. ........... 455/186.2 |
| 6,799,303 B2 | * | 9/2004 | Blumberg ...................... 715/257 |
| 6,810,272 B2 | | 10/2004 | Kraft et al. |
| 6,885,318 B2 | | 4/2005 | Bickerton |
| 6,919,879 B2 | * | 7/2005 | Griffin et al. .................. 345/168 |
| 6,947,770 B2 | * | 9/2005 | Rydbeck ........................ 455/564 |

(Continued)

FOREIGN PATENT DOCUMENTS

EP 0 834 108 10/2001

(Continued)

OTHER PUBLICATIONS

Sugimoto Masakatsu, SHK; Single Hand Key Card for Mobile Devices, Apr. 13, 1996, CHI 96.*

*Primary Examiner* — Kieu Vu
*Assistant Examiner* — Nicholas Ulrich
(74) *Attorney, Agent, or Firm* — The Farrell Law Firm, P.C.

(57) ABSTRACT

A character input method and a mobile communication terminal using the method. The character input method includes: finding, in response to input of a key in a character input mode, at least one mapping of the key; creating, if the key has at least two mappings, a string selection list containing characters mapped by the mappings; displaying the string selection list; and displaying, if one of the strings in the string selection list is selected, the selected string in an input window. As a result, the user can conveniently input various pieces of information mapped to keys, including letters and numbers, to a mobile communication terminal without switching of input modes.

14 Claims, 9 Drawing Sheets

U.S. PATENT DOCUMENTS

| | | | |
|---|---|---|---|
| 7,072,461 B2 * | 7/2006 | Padawer et al. | 379/355.09 |
| 7,091,885 B2 * | 8/2006 | Fux et al. | 341/22 |
| 7,117,144 B2 * | 10/2006 | Goodman et al. | 704/9 |
| 7,143,090 B2 * | 11/2006 | Spalink et al. | 1/1 |
| 7,149,550 B2 * | 12/2006 | Kraft et al. | 455/566 |
| 7,283,065 B2 * | 10/2007 | Scott et al. | 341/22 |
| 7,679,534 B2 * | 3/2010 | Kay et al. | 341/22 |
| 2002/0126097 A1 * | 9/2002 | Savolainen | 345/168 |
| 2005/0091431 A1 * | 4/2005 | Olodort et al. | 710/72 |
| 2007/0076862 A1 * | 4/2007 | Chatterjee et al. | 379/433.06 |
| 2007/0285397 A1 * | 12/2007 | LaPointe et al. | 345/169 |

FOREIGN PATENT DOCUMENTS

| | | |
|---|---|---|
| KR | 1020040058719 | 7/2004 |
| KR | 1020050079126 | 8/2005 |

* cited by examiner

| KEY IDENTIFIER (11) | FIRST MAPPING (13) | SECOND MAPPING (15) |
|---|---|---|
| 1 | Q | • |
| 2 | W | 1 |
| 3 | E | 2 |
| 4 | R | 3 |
| 5 | T | • |
| 6 | Y | • |
| 7 | U | • |
| 8 | I | • |
| 9 | O | • |
| 10 | P | • |
| 11 | A | • |
| 12 | S | 4 |
| 13 | D | 5 |
| 14 | F | 6 |
| 15 | G | • |
| 16 | H | • |
| 17 | J | • |
| 18 | K | • |
| 19 | L | • |
| 20 | ← | • |
| 21 | Fn | • |
| 22 | Z | 7 |
| 23 | X | 8 |
| 24 | C | 9 |
| 25 | V | • |
| 26 | B | • |
| 27 | N | • |
| ⋮ | ⋮ | ⋮ |

CHARACTER INPUT METHOD AND MOBILE COMMUNICATION TERMINAL USING THE SAME

PRIORITY

This application claims priority to an application filed in the Korean Intellectual Property Office on Jun. 30, 2006 and assigned Serial No. 2006-0060213, the contents of which are incorporated herein by reference.

BACKGROUND OF THE INVENTION

1. Field of the Invention

The present invention generally relates to a mobile communication terminal and, more particularly, to a character input method for a mobile communication terminal.

2. Description of the Related Art

Advances in communication technologies have enabled popularization of mobile communication terminals. In addition to conventional phone call processing, advanced mobile communication terminals support various functions including text message and image transmission. Thereby users utilize mobile communication terminals more and more in their daily lives. For example, mobile communication terminals are used to perform various tasks, such as placement of calls, photographing, schedule management, reception of moving pictures and music, gaming, etc.

With increased utilization of a mobile communication terminal, there is an increasing need for a user to input characters to their mobile communication terminal. For example, character input is necessary to input text for message transmission, input data on events and associated times for schedule management, and input names of images that are captured by a digital camera equipped in a mobile communication terminal.

For high portability, the keypad of a mobile communication terminal is limited in size, and therefore the number of key buttons installable on a mobile communication terminal is limited. To solve this problem, multiple input modes are provided to a mobile communication terminal, and a key is mapped to a different character according to a current input mode. For example, a mobile communication terminal may have separate input modes for Korean characters, English upper-case letters, English lower-case letters, numeric digits, and special characters. Thus, a single key is mapped to one of a Korean letter, English upper-case letter, English lower-case letter, numeric digit and special character, depending upon the current input mode.

However, in a general mobile communication terminal having, for example, twelve keys, the keys are insufficient to cover all characters in a particular input mode. Consequently, some of the keys must be mapped to multiple characters in an input mode. For example, when a key '1' is mapped to characters 'q' and 'z' in a lower-case letter input mode, the characters 'q' and 'z' are alternately displayed in an input box whenever the key '1' is pressed. Hence, the user may have to press the key '1' two times to input the character 'z'.

For more convenient character input, a "QWERTY phone" (a mobile communication terminal whose keypad is a QWERTY keypad, similar to that of a computer) has been developed. In a QWERTY phone, a key is mapped to one character in an input mode.

However, even in a QWERTY phone, keys are not separately mapped to numeric digits. When the user desires to input a number to their QWERTY phone during character input, the user may have to switch the current input mode to a number input mode. Further, when the user inputs character data, numeric data such as a phone number or year, and character data in that order, the user is inconvenienced by having to repeatedly switch between input modes.

SUMMARY OF THE INVENTION

The present invention has been made in view of the above problems, and an object of the present invention is to provide a character input method and a mobile communication terminal using the method enabling convenient input of characters.

Another object of the present invention is to provide a character input method and a mobile communication terminal using the method wherein selectable strings of mapped characters corresponding to user input keys are provided for convenient input of characters.

Another object of the present invention is to provide a character input method and a mobile communication terminal using the method wherein various pieces of information mapped to keys can be input without switching of input modes.

Another object of the present invention is to provide a character input method and a mobile communication terminal using the method wherein letters and numbers can be input without switching of input modes.

In accordance with the present invention, there is provided a character input method for a mobile communication terminal, including: finding, in response to input of a key in a character input mode, at least one mapping of the key; creating, if the key has at least two mappings, a string selection list containing strings of characters mapped by the mappings; displaying the string selection list; and displaying, if one of the strings in the string selection list is selected, the selected string in an input window.

Preferably, in the creating a string selection list step, in response to successive input of keys having at least two mappings, strings of mapped characters corresponding to individual kinds of mappings are created, wherein all of the mapped characters within a string correspond to the same kind of mapping, and the string selection list containing the strings of mapped characters is generated.

The creating a string selection list step may further include: extracting, if a digit string is present among the strings of mapped characters, a phone number containing the digit string from a pre-stored phonebook; extracting a name associated with the phone number; and inserting the extracted phone number and name into the string selection list.

The creating a string selection list step may further include: selecting, if a digit string is present among the strings of mapped characters, a commonly used expression associated with the digit string from pre-stored commonly used expressions; and inserting the selected commonly used expression into the string selection list.

Preferably, in the displaying the string selection list step, the string selection list is displayed in the form of a popup.

The character input method may further include erasing, in response to input of a key having a single mapping during display of a string selection list, the string selection list.

The character input method may further include disabling, if the key has a single mapping, display of a string selection list until a word containing a character mapped by the single mapping is completed.

In accordance with the present invention, there is also provided a mobile communication terminal including: an input unit with a plurality of keys, each key having at least one mapping; a key mapping memory for storing the mappings of the keys; a controller for finding, in response to input of a key, a mapping of the key from the key mapping memory, and for creating, if the key has at least two mappings, a string selection list containing characters mapped by the mappings; and a display unit for displaying a mapped character of the key and the created string selection list.

Preferably, in response to successive input of keys having at least two mappings, the controller creates strings of mapped characters corresponding to individual kinds of mappings, and generates the string selection list containing the strings of mapped characters.

The mobile communication terminal may further include a phonebook memory, wherein, preferably, if a digit string is present among the strings of mapped characters, the controller extracts a phone number containing the digit string and a name associated with the phone number from a phonebook stored in the phonebook memory, and inserts the extracted phone number and name into the string selection list.

The mobile communication terminal may further include a common expression memory for storing commonly used expressions associated with digit strings, wherein, preferably, if a digit string is present among the strings of mapped characters, the controller selects a commonly used expression associated with the digit string from the common expression memory, and inserts the selected commonly used expression into the string selection list.

The display unit may include an input display area, wherein, preferably, the display unit displays the mapped character of the key in the input display area and also displays the string selection list in the form of a popup.

Preferably, the controller erases, in response to input of a key having a single mapping during display of a string selection list, the string selection list.

Preferably, the controller disables, if the key has a single mapping, display of a string selection list until a word containing a character mapped by the single mapping is completed.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Hereinafter, preferred embodiments of the present invention are described in detail with reference to the accompanying drawings. The same reference symbols identify the same or corresponding elements in the drawings. Some constructions or processes known in the art may be not described to avoid obscuring the invention in unnecessary detail.

Figure 1:
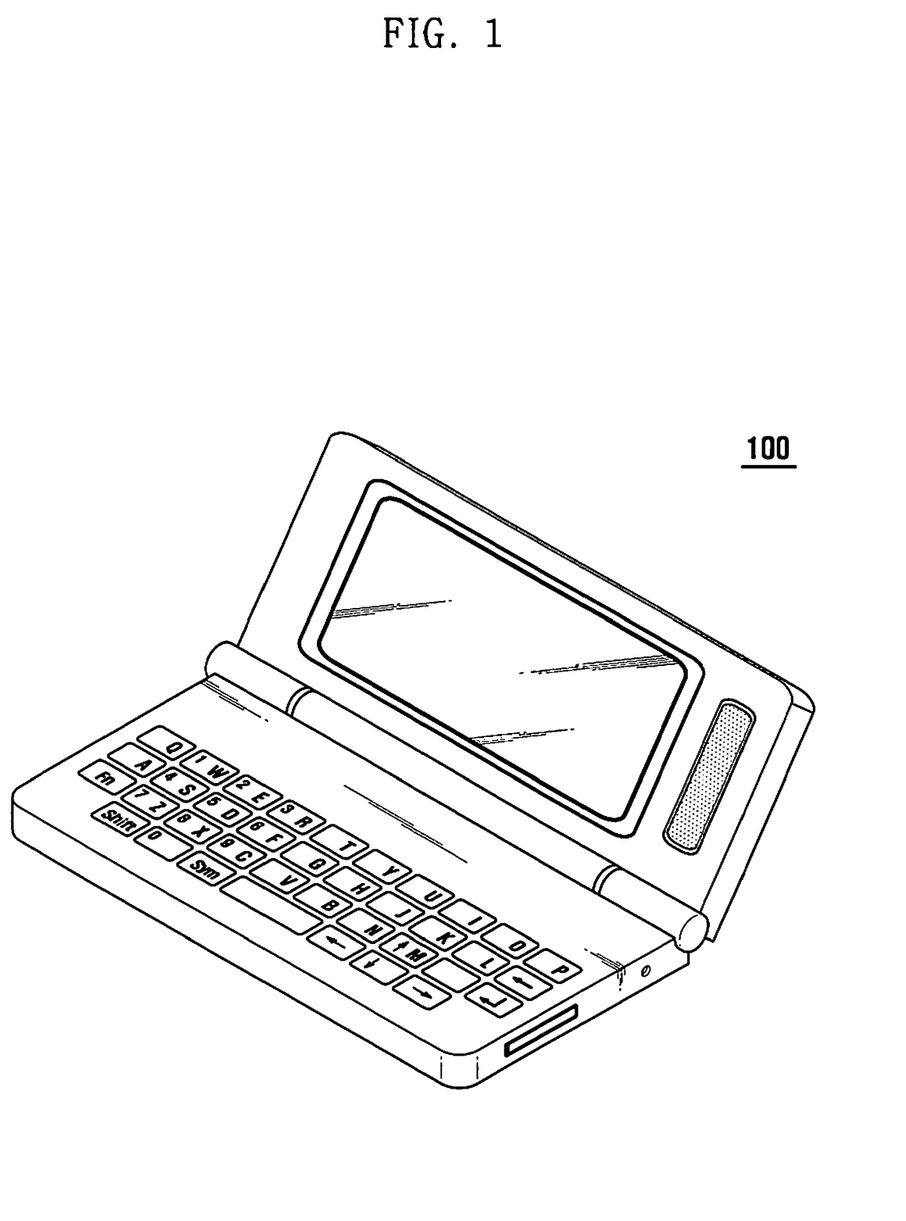
FIG. 1 illustrates a usage state of a mobile communication terminal according to the present invention.

FIG. 1 shows a usage state of a mobile communication terminal according to an exemplary embodiment of the present invention. The mobile communication terminal 100 of FIG. 1 is a QWERTY phone whose keypad has a QWERTY layout essentially identical to that of a computer keyboard. The present invention provides a character input method for the mobile communication terminal 100 wherein character data and numeric data can be input without switching of input modes.

Figure 2:
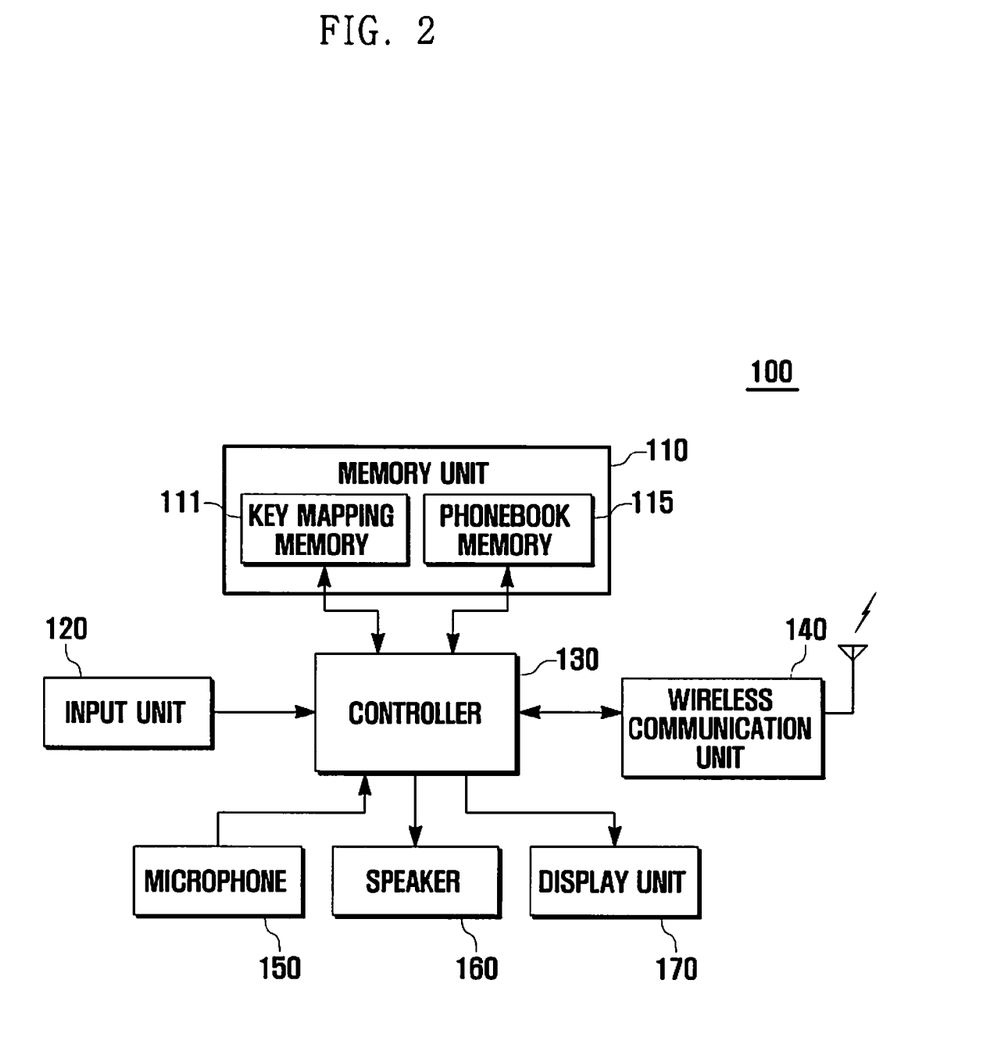
FIG. 2 illustrates a configuration of the mobile communication terminal of FIG. 1.

FIG. 2 shows the mobile communication terminal of FIG. 1. The mobile communication terminal 100 includes a memory unit 110, an input unit 120, a controller 130, a wireless communication unit 140, a microphone 150, a speaker 160, and a display unit 170.

Figure 3:
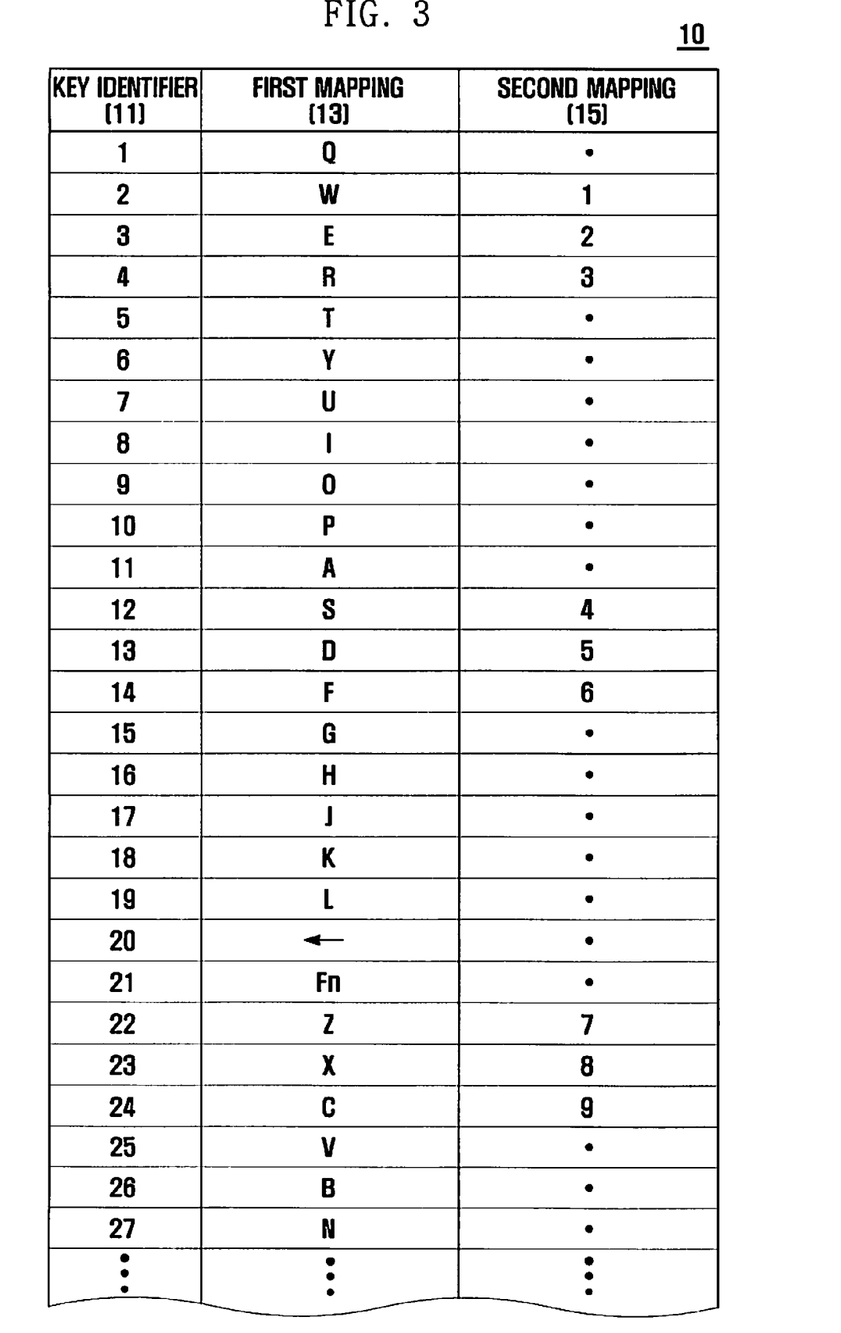
FIG. 3 illustrates a key mapping table in the mobile communication terminal of FIG. 1.

The memory unit 110 stores information regarding operation of the mobile communication terminal 100 (for example, operation programs and associated data). Preferably, the memory unit 110 includes a key mapping memory 111 for storing key mapping information, and a phonebook memory 115. A key mapping table is stored in the key mapping memory 111 to manage key mappings, and is shown in FIG. 3. In the key mapping table of FIG. 3, for each key, a key identifier 11, such as a sequence number, is assigned for key identification, and a first mapping 13 and second mapping 15 are assigned. The first mapping 13 is associated with an English letter or a function key value, and the second mapping 15 is associated with a numeric digit. As shown in FIG. 3, a first key identified by a key identifier '1' is mapped to a letter 'Q', and a second key identified by a key identifier '2' is mapped to both a letter 'W' and a digit '1'.

The input unit 120 provides an interface to a user for operation control of the mobile communication terminal 100. For example, the input unit 120 includes a keypad, and receives a signal of a key through the keypad from the user and sends the key signal to the controller 130. Preferably, the input unit 120 includes a plurality of keys, each key having at least one mapping, as shown in FIG. 3.

The controller 130 controls operation of the mobile communication terminal 100 based on signals input through the input unit 120 and operation programs pre-stored in the memory unit 110. In particular, when a key is input through the input unit 120, the controller 130 finds a mapping associated with the key from the key mapping memory 111, and controls the display unit 170 to display a character related to the found mapping in an input display area thereof. For example, in response to input of the first key in FIG. 3, the controller 130 displays a character 'Q' mapped with the first key in the input display area, using the key mapping table shown in FIG. 3.

If a key having at least two mappings is input, the controller 130 creates a string selection list using characters mapped with the input key. Preferably, when keys having at least two mappings are successively input, the controller 130 creates strings of mapped characters according to individual kinds of mappings, and creates a string selection list containing the created character strings. A character string is a string composed of, for example, English letters, numerical digits, Korean characters, or English and Korean characters.

For example, referring to FIG. 3, when the second key and third key are successively input, the controller 130 displays characters 'W' and 'E' on the input display area of the display unit 170, and also creates a string selection list containing both a character string 'WE' of the mapped characters 'W' and 'E' related to the first mappings of the second and third keys, and a digit string '12' of the mapped numeric digits '1' and '2' related to the second mappings of the second and third keys. The controller 130 then displays the string selection list in a pop-up window, for example, within the input display area of the display unit 170. Thereafter, in response to a user selection, the controller 130 displays the selected string (in this example, either the character string or the digit string) in the input display area of the display unit 170. Consequently, the user can input numeric data without switching of input modes. In the above example, if the user selects the digit string '12', the user can directly input numeric data without input mode switching from an English input mode to a number input mode.

Further, preferably, if a digit string is present among strings of mapped characters, the controller 130 extracts a phone number containing the digit string and a name associated with the phone number from the phonebook memory 115, and inserts the extracted phone number and name into the string selection list. For example, if a string selection list contains strings 'WE' and '12', the controller 130 finds a phone number containing the digit string '12' and an associated name from a phonebook, and inserts the found phone number and name into the string selection list.

Preferably, when the memory unit 110 further includes a common expression memory (not shown) for storing commonly used expressions, if a digit string is present in a string selection list, the controller 130 finds a commonly used expression associated with the digit string from the common expression memory, and inserts the found commonly used expression into the string selection list. For example, if a digit string '12' in a string selection list is associated with a commonly used expression 'How are you?', the controller 130 inserts the expression 'How are you?' into the string selection list.

Preferably, if a key having a single mapping is input while a string selection list is displayed, the controller 130 erases the string selection list, and disables display of a string selection list until a word of characters mapped with subsequent input keys is completed.

Preferably, if the initial character of a word is mapped with an input key having a single mapping, the controller 130 disables display of a string selection list until the word is completed.

To control display of a string selection list, the controller 130 preferably uses a list enable flag. For example, the controller 130 initially sets the list enable flag to '1', and sets the list enable flag to '0' when a condition to disable display of a string selection list, described above, is satisfied. In response to input of a key having at least two mappings during a character input mode, the controller 130 checks the list enable flag and enables generation and display of a string selection list if the list enable flag is set to '1'.

The wireless communication unit 140 provides an interface for access to a wireless communication network. For example, under the control of the controller 130, the wireless communication unit 140 transmits data to or receives data from the wireless communication network.

The microphone 150 receives an acoustic signal (for example, a voice signal of the user) from the surrounding environment and transmits the acoustic signal to the controller 130. The speaker 160 outputs an acoustic signal under the control of the controller 130.

The display unit 170 outputs a visual signal under the control of the controller 130. In particular, the display unit 170 displays characters mapped with input keys and a string selection list. Preferably, the display unit 170 includes an input display area, and displays the mapped characters in the input display area and also displays the string selection list as a popup within the input display area.

Figure 4A:
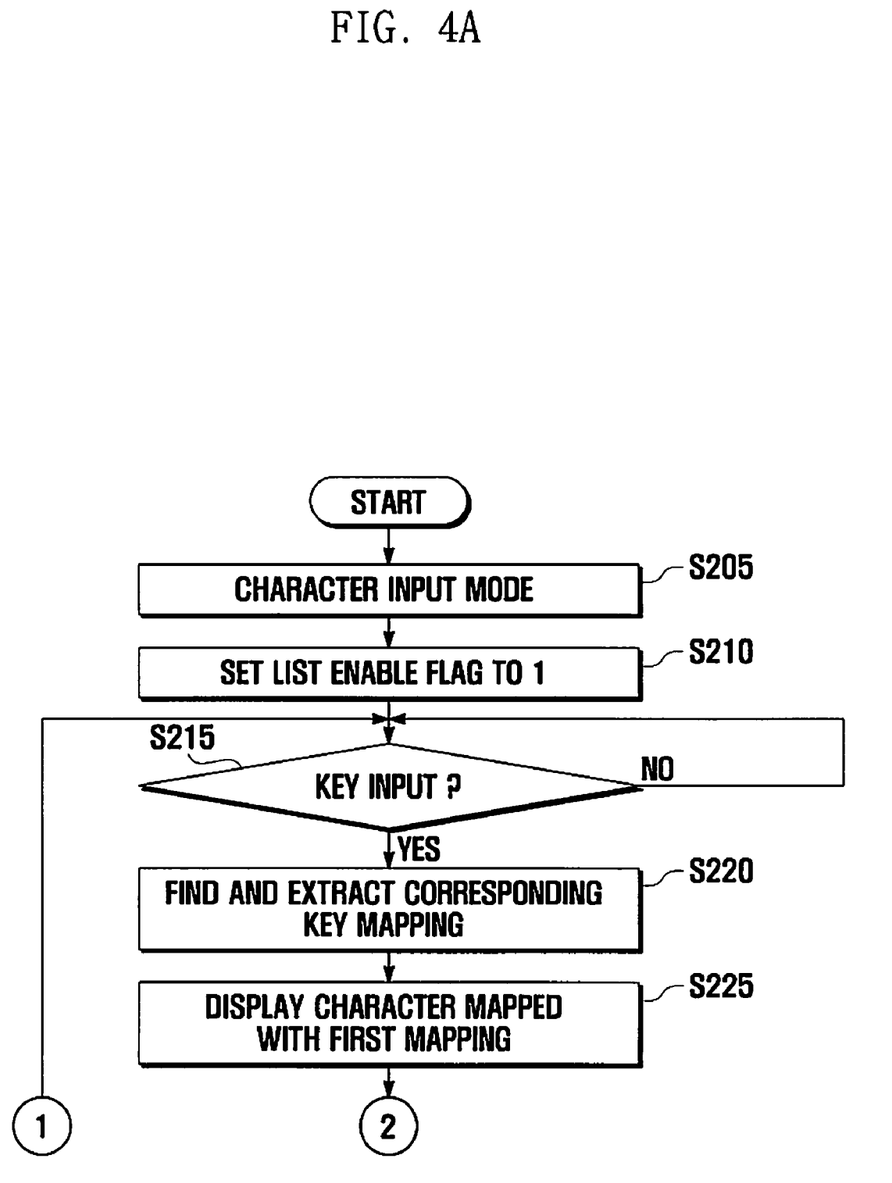
FIGS. 4A and 4B are flow charts illustrating steps of a character input method according to the present invention.
Figure 4B:
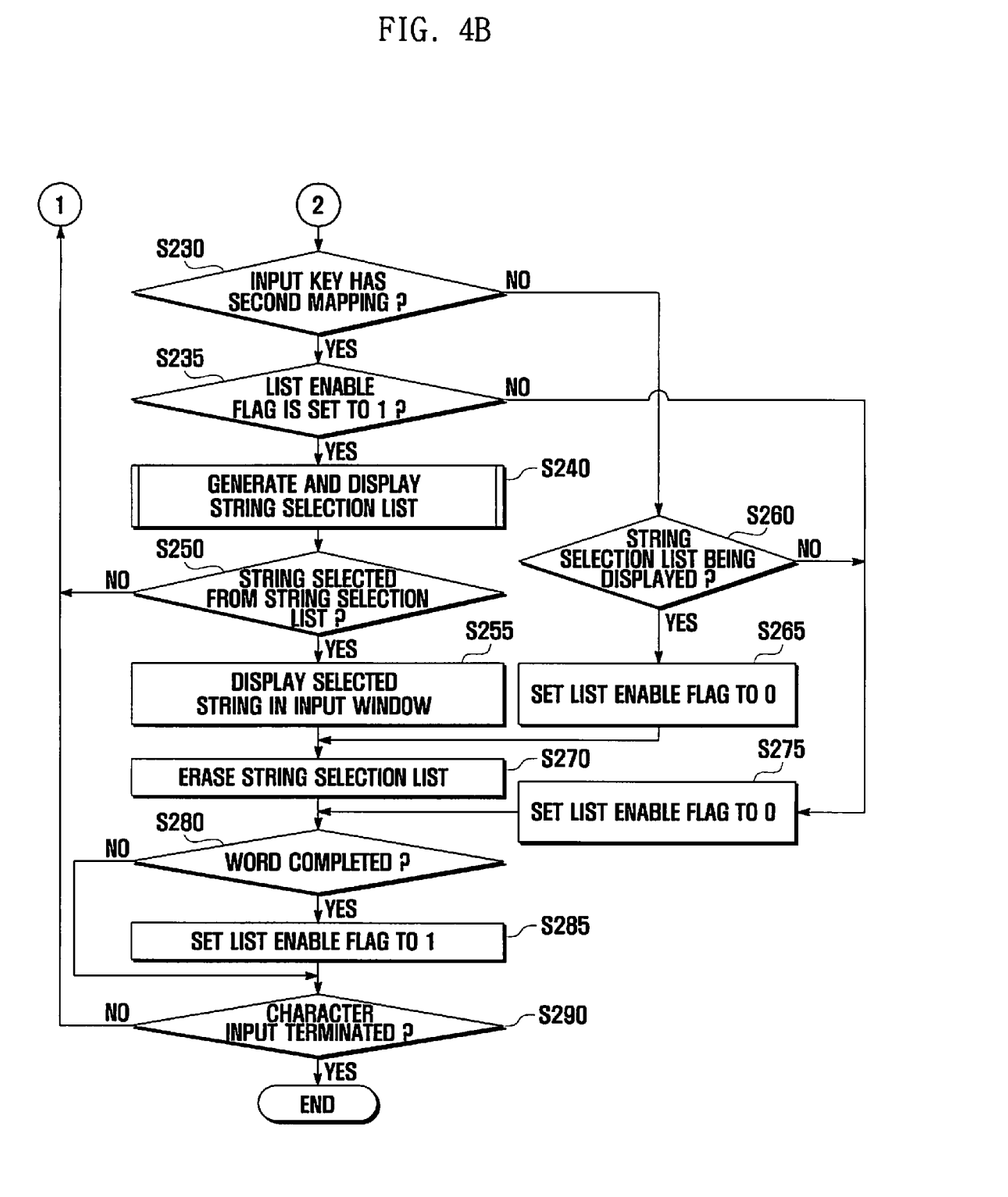

FIGS. 4A and 4B show a character input method for a mobile communication terminal according to another exemplary embodiment of the present invention. Referring to FIGS. 2, 4A and 4B, the method is described as follows.

When the mobile communication terminal 100 is in a character input mode in step S205, the controller 130 initially sets a list enable flag to '1' in step S210. Display of a string selection list is enabled when the list enable flag is set to '1', and is disabled when the list enable flag is set to '0'. While display of a string selection list is disabled, a string selection list is not displayed even if a key having at least two mappings is input. This is because it may be desirable to display a string selection list when two keys having at least two mappings are successively input.

If a key is input in step S215, the controller 130 finds and extracts corresponding key mappings from the key mapping memory 111 in step S220. The controller 130 extracts a first mapping associated with the input key from a key mapping table shown in FIG. 3. If a second mapping associated with the input key is present, the second mapping is also extracted. For example, if the first key in FIG. 3 is input, only the associated first mapping ('Q') is extracted (the first key has no second mapping). If the second key in FIG. 3 is input, both the associated first mapping ('W') and second mapping ('1') are extracted.

The controller 130 displays a character mapped with the extracted first mapping in an input display area of the display unit 170 in step S225. For example, the character 'Q' is displayed if the first key is input, and the character 'W' is displayed if the second key is input.

The controller 130 determines whether a second mapping associated with the input key is present in step S230. If a second mapping is present, the controller 130 checks the list enable flag in step S235 to determine whether display of a string selection list is enabled. If the list enable flag is set to '1' (namely, if display of a string selection list is enabled), the controller 130 creates a string selection list using the first and second mappings, and controls a display operation to display the string selection list, preferably, as a popup in step S240.

Figure 5:
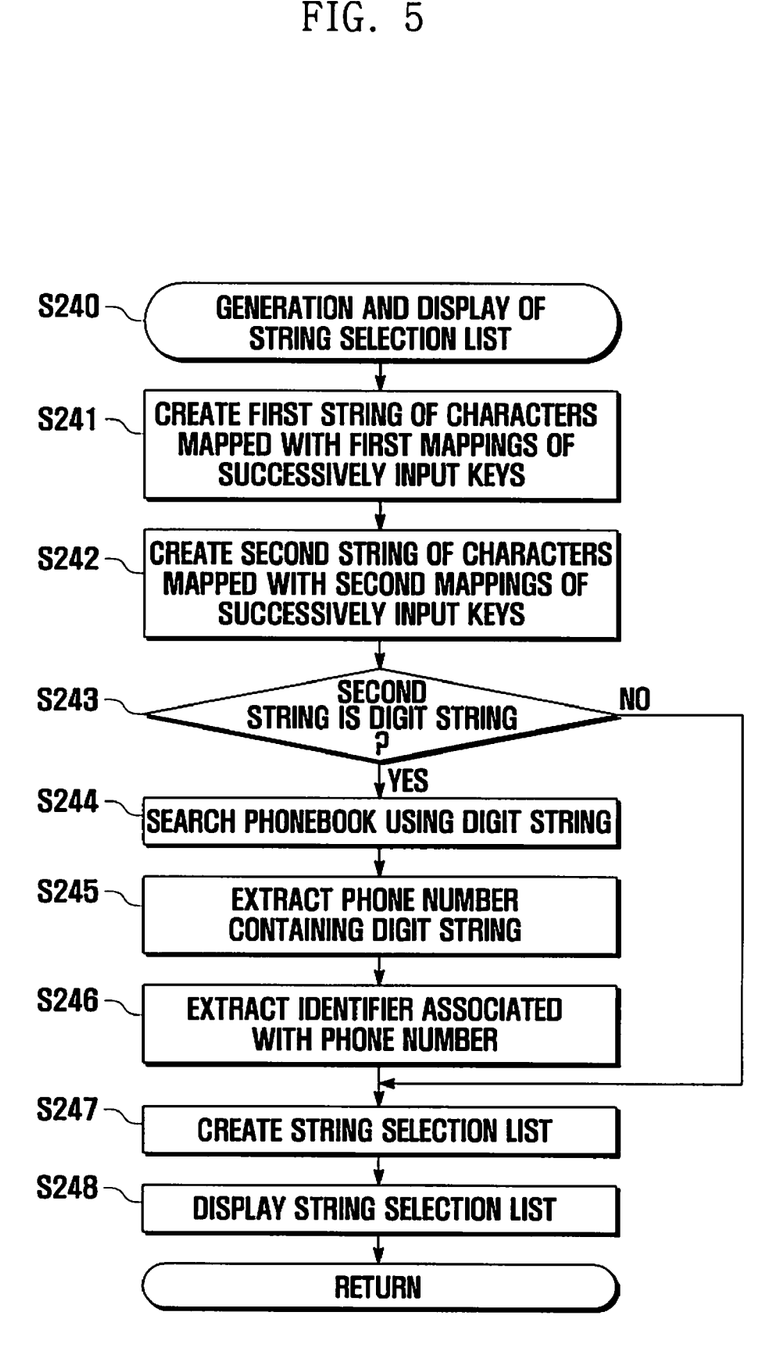
FIG. 5 is a detailed flow chart illustrating a step of generating and displaying a string selection list in the flow chart of FIG. 4B.

Step S240 of creation and display of a string selection list is shown in FIG. 5, and is described later.

After display of the string selection list at step S240, the controller 130 determines whether one of the character strings contained in the string selection list is selected in step S250. If a character string is selected, the controller 130 controls a display operation to display the selected string in an input window in step S255 (namely, the input display area of the display unit 170), and erases the string selection list in step S270.

If no second mapping associated with the input key is determined to be present at step S230, the controller 130 disables display of a string selection list. That is, the controller 130 determines whether a string selection list is being displayed in step S260. If a string selection list is being displayed, the controller 130 resets the list enable flag to '0' in step S265, and erases the displayed string selection list in step S270. If a string selection list is not displayed, the controller 130 resets the list enable flag to 'O' in step S275. Thereafter, the controller 130 disables display of a string selection list, by retaining the value '0' of the list enable flag, until a word that is being formed composed of characters mapped with first mappings is completed. That is, the controller 130 determines whether a word that is being formed is completed in step S280. Completion of a word may be determined by, for example, input of a space or selection of a character string in a string selection list. If the word that is being formed is completed, the controller 130 resets the list enable flag to '1' in step S285, and awaits input of a new key. If the word being formed is not completed, the controller 130 retains the value '0' of the list enable flag, and awaits input of a new key. This is because it may be desirable to display a string selection list when two keys having a second mapping are successively input.

Steps S215 to S285 are repeated until character input is terminated in step S290.

FIG. 5 shows the step S240 in FIG. 4B for generation and display of a string selection list. Referring to FIG. 5, generation and display of a string selection list is described as follows.

When keys having first and second mappings are successively input, the controller 130 creates a first character string of characters mapped with the first mappings in step S241 and also creates a second character string of characters mapped with the second mappings in step S242.

For example, referring to FIG. 3, when the second key and third key are successively input, the controller 130 creates a first character string 'WE' of characters 'W' and 'E' mapped with the first mappings of the second and third keys, and a second character string '12' of characters '1' and '2' mapped with the second mappings of the second and third keys.

The controller 130 determines whether a digit string is present among the created character strings in step S243. If a digit string is not present, the controller 130 creates a string selection list containing the first and second character strings in step S247 and displays the string selection list in step S248.

If a digit string is determined to be present at step S243, the controller 130 searches a phonebook using the digit string in step S244, extracts a phone number containing the digit string in step S245 and an identifier such as a name associated with the phone number in step S246, creates a string selection list containing the first and second character strings and the extracted phone number and identifier in step S247, and displays the string selection list in step S248. For example, in the case where a first character string is 'WE' and a second character string is '12', because the second character string is a digit string, the controller 130 extracts a phone number containing '12' and identifier of the phone number from a phonebook at steps S244 to S246.

In addition, when the memory unit 110 further includes a common expression memory (not shown) for storing commonly used expressions, if a digit string is present among the created character strings, the controller 130 finds a commonly used expression associated with the digit string from the common expression memory, and creates a string selection list further containing the found commonly used expression (not shown). For example, if a digit string '12' is associated with a commonly used expression 'How are you?', the controller 130 inserts the expression 'How are you?' into the string selection list.

Figure 6A:
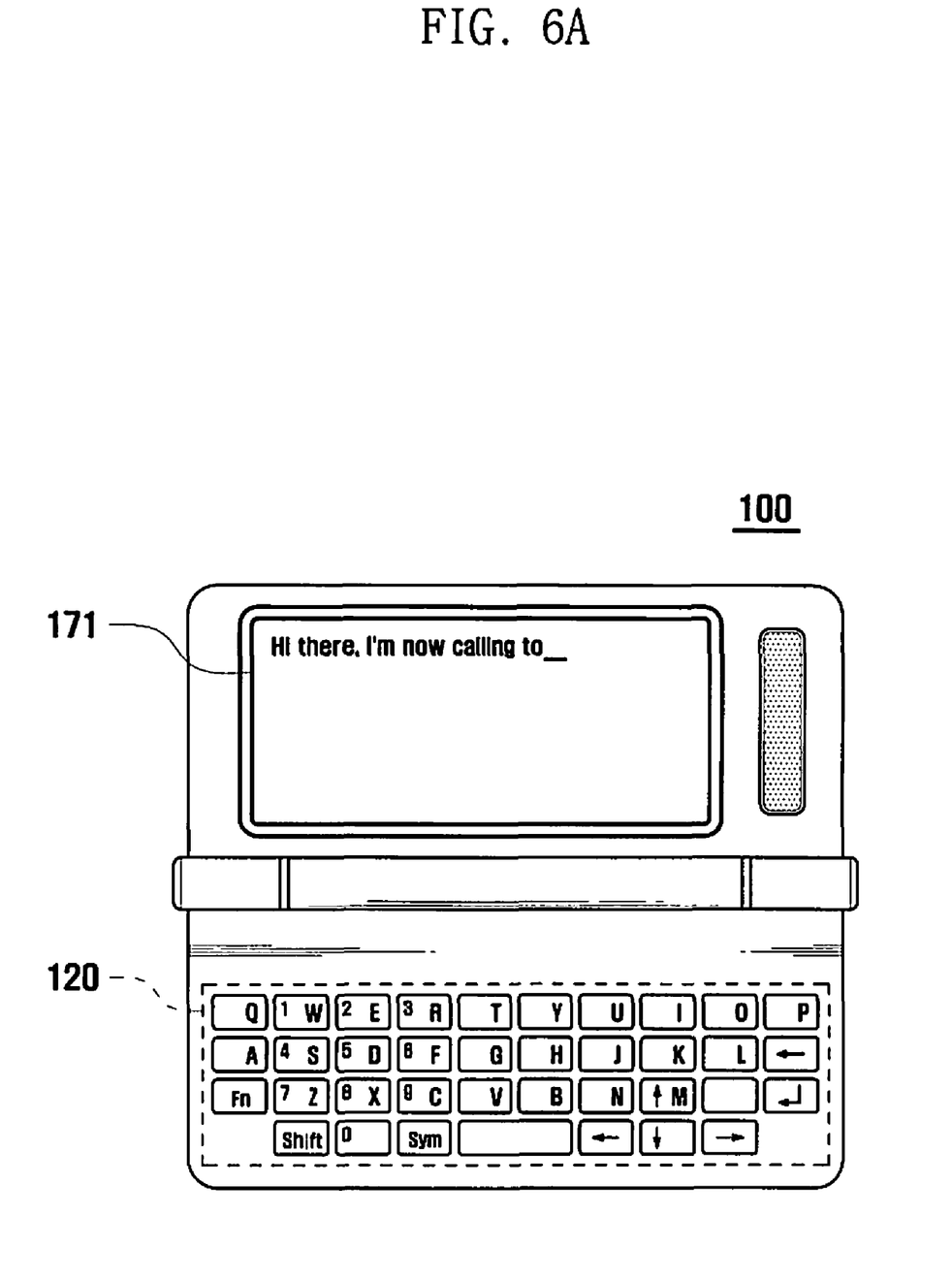
FIGS. 6A to 6C illustrate display screen representations of the mobile communication terminal of FIG. 1.
Figure 6B:
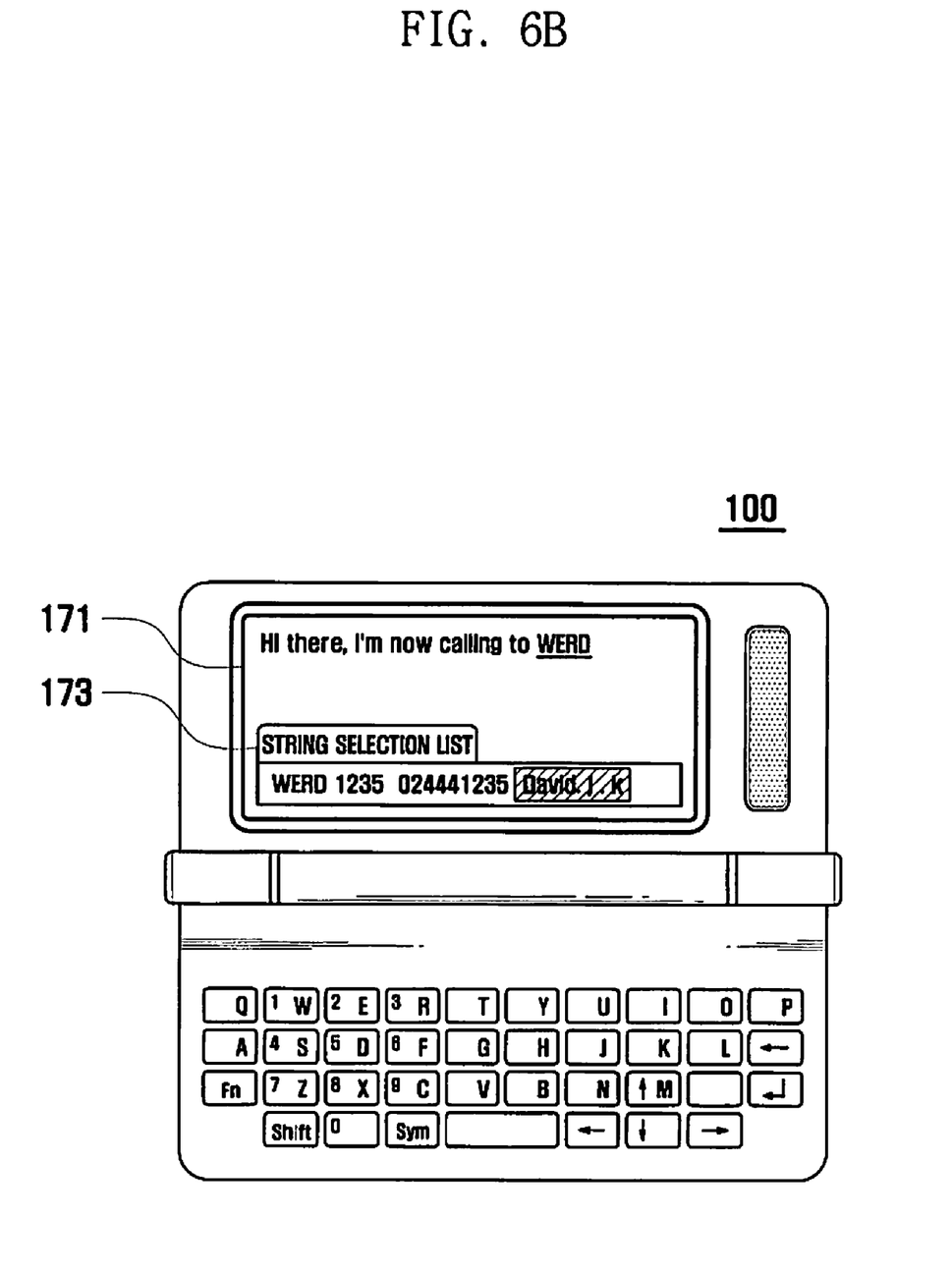
Figure 6C:
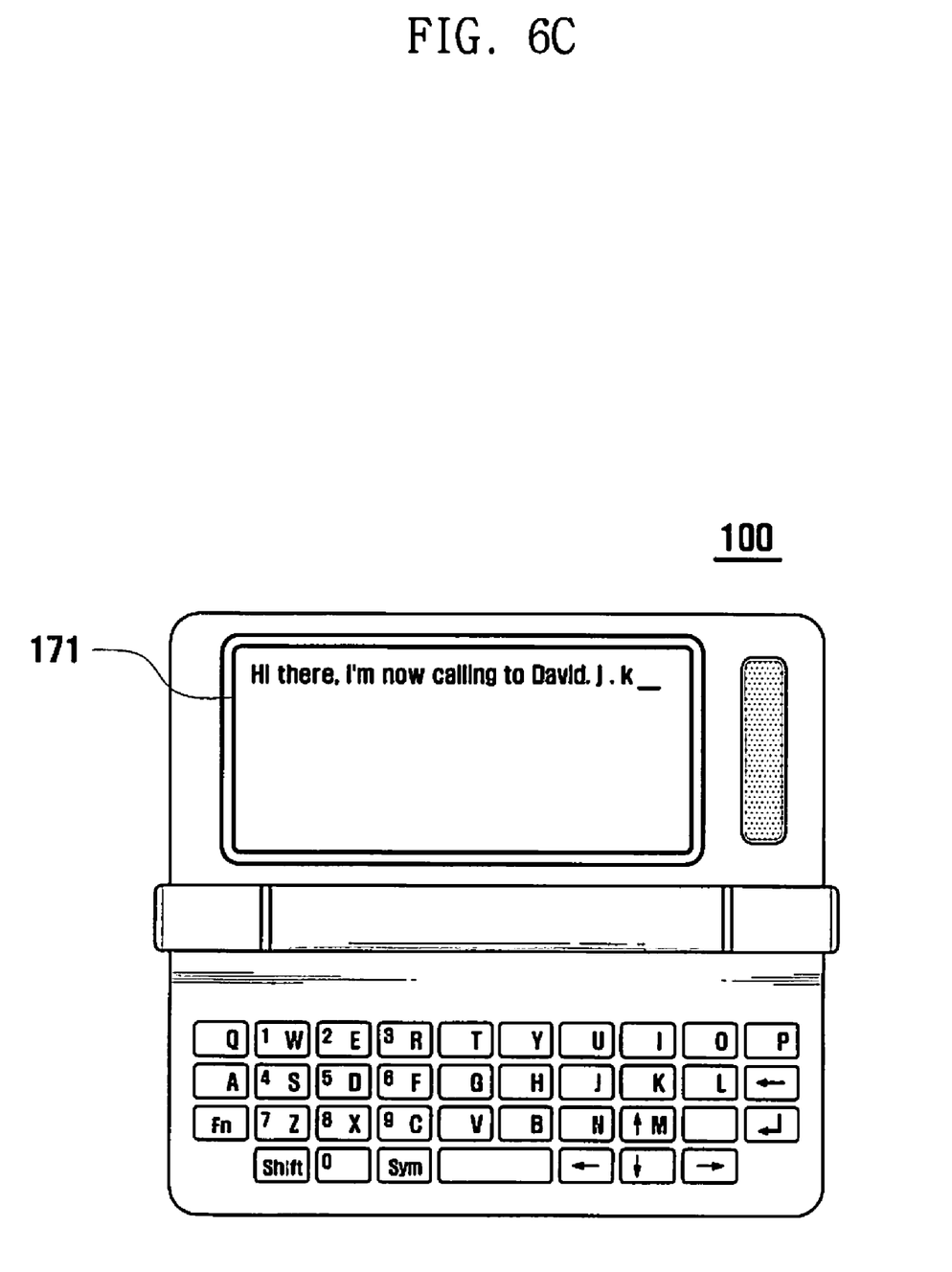

FIGS. 6A to 6C show display screen representations of the mobile communication terminal of FIG. 1. FIG. 6A shows an example in which characters 'Hi there, I'm now calling to' input through the input unit 120 are displayed in an input display area 171 of the display unit 170.

FIG. 6B shows that a key mapped to characters 'W' and '1', a key mapped to characters 'E' and '2', a key mapped to characters 'R' and '3', and a key mapped to characters 'D' and '5' are successively input in that order after input of the characters in FIG. 6A. In response to successive input of the keys, a string selection list is created and displayed in a popup window 173 within the input display area 171. The string selection list includes an English character string 'WERD' of the mapped letters, a digit string '1235' of the mapped digits, a phone number '024441235' containing the digit string, and a name 'David.J.k' associated with the phone number.

FIG. 6C shows that the name 'David.J.k' associated with the phone number is selected from the string selection list in FIG. 6B.

As shown in FIGS. 6A to 6C, whereas the user input keys mapped respectively to 'W', 'E', 'R' and 'D', the name 'David.J.k' is selected and input to the input display area. If the phone number were selected, the phone number '024441235' would be input. As a result, the user can input characters in a more convenient manner.

As apparent from the above description, the present invention provides a character input method and a mobile communication terminal using the method wherein selectable strings of mapped characters corresponding to user input keys are provided so that various pieces of information mapped to keys can be input without switching of input modes. Further, the user can conveniently input letters and numbers without switching of input modes.

While preferred embodiments of the present invention have been shown and described in this specification, it will be understood by those skilled in the art that various changes or modifications of the embodiments are possible without departing from the spirit and scope of the invention as defined by the appended claims. For example, in the description, although phonebook search using a digit string is illustrated, a digit string may also be used for other purposes. Although switching between English letters and numeric digits is illustrated, switching between other sets of characters may also be performed depending upon key mappings.

What is claimed is:

1. A character input method for a mobile communication terminal, comprising:
   finding, in response to input of a key in a character input mode, at least one mapping of the key;
   creating, if the key has at least two mappings, a string selection list containing strings of characters mapped by the mappings;
   displaying the string selection list; and
   displaying, if one of the strings in the string selection list is selected, the selected string in an input window,
   wherein, for each one of the strings of characters mapped by the mappings, all of the characters within the one of the strings correspond to a same kind of mapping, and
   wherein each kind of mapping maps at most one character to each key of the mobile communication terminal,
   wherein in creating the string selection list, in response to successive input of keys having at least two mappings, strings of mapped characters corresponding to individual kinds of mappings are created, wherein the string selection list containing the strings of mapped characters is generated,
   wherein the creating a string selection list step further comprises:
      extracting, if a digit string is present among the strings of mapped characters, a phone number containing the digit string from a pre-stored phonebook;
      extracting a name associated with the phone number; and
      inserting the extracted phone number and name into the string selection list, and
   wherein the extracted phone number and the extracted name are inserted into the string selection list as separate selectable entries within the string selection list.

2. The character input method of claim 1, wherein the creating a string selection list step further comprises:

selecting, if a digit string is present among the strings of mapped characters, a commonly used expression associated with the digit string from pre-stored commonly used expressions; and inserting the selected commonly used expression into the string selection list.

3. The character input method of claim 1, wherein the creating a string selection list step further comprises:

selecting a commonly used expression associated with the digit string from pre-stored commonly used expressions; and inserting the selected commonly used expression into the string selection list.

4. The character input method of claim 1, wherein in the displaying the string selection list step, the string selection list is displayed in a form of a popup.

5. The character input method of claim 1, further comprising erasing, in response to input of a key having a single mapping during display of the string selection list, the string selection list.

6. The character input method of claim 5, further comprising disabling display of the string selection list until a word that is being formed composed of mapped characters is completed.

7. The character input method of claim 1, further comprising disabling, if the key has a single mapping, display of the string selection list until a word containing a character mapped by the single mapping is completed.

8. A mobile communication terminal comprising:

an input unit comprising a plurality of keys, each key having at least one mapping;

a key mapping memory for storing the mappings of the keys;

a controller for finding, in response to input of a key, a mapping of the key from the key mapping memory, and for creating, if the key has at least two mappings, a string selection list containing strings of characters mapped by the mappings;

a phonebook memory; and a display unit for displaying a mapped character of the key and the created string selection list, wherein, for each one of the strings of characters mapped by the mappings, all of the characters within the one of the strings correspond to a same kind of mapping, and wherein each kind of mapping maps at most one character to each key of the mobile communication terminal, wherein in response to successive input of keys having at least two mappings, the controller creates strings of mapped characters corresponding to individual kinds of mappings, and generates the string selection list containing the strings of mapped characters, wherein, if a digit string is present among the strings of mapped characters, the controller extracts a phone number containing the digit string and a name associated with the phone number from a phonebook stored in the phonebook memory, and inserts the extracted phone number and name into the string selection list, and wherein the extracted phone number and the extracted name are inserted into the string selection list as separate selectable entries within the string selection list.

9. The mobile communication terminal of claim 8, further comprising a common expression memory for storing commonly used expressions associated with digit strings, and wherein, if a digit string is present among the strings of mapped characters, the controller selects a commonly used expression associated with the digit string from the common expression memory, and inserts the selected commonly used expression into the string selection list.

10. The mobile communication terminal of claim 8, further comprising a common expression memory for storing commonly used expressions associated with digit strings, and wherein, if a digit string is present among the strings of mapped characters, the controller selects a commonly used expression associated with the digit string from the common expression memory, and inserts the selected commonly used expression into the string selection list.

11. The mobile communication terminal of claim 8, wherein the display unit comprises an input display area, and wherein the display unit displays the mapped character of the key in the input display area and also displays the string selection list in the form of a popup.

12. The mobile communication terminal of claim 8, wherein the controller erases, in response to input of a key having a single mapping during display of the string selection list, the string selection list.

13. The mobile communication terminal of claim 12, wherein the controller disables display of the string selection list until a word that is being formed composed of mapped characters is completed.

14. The mobile communication terminal of claim 8, wherein the controller disables, if the key has a single mapping, display of the string selection list until a word containing a character mapped by the single mapping is completed.

* * * * *